United States Patent [19]

Consolloy

[11] 3,713,895
[45] Jan. 30, 1973

[54] MULTICELL BATTERY HAVING MEMBRANE SEALED BETWEEN COVER AND CONTAINER

[75] Inventor: James W. Consolloy, Pennington, N.J.

[73] Assignee: ESB Incorporated

[22] Filed: June 29, 1971

[21] Appl. No.: 157,847

Related U.S. Application Data

[63] Continuation of Ser. No. 885,856, Dec. 17, 1969, abandoned.

[52] U.S. Cl. ..................... 136/114, 136/90, 136/166
[51] Int. Cl. .......................................... H01m 21/10
[58] Field of Search ........ 136/114, 112, 113, 90, 166, 136/170, 133

[56] References Cited

UNITED STATES PATENTS

| | | | |
|---|---|---|---|
| 2,624,767 | 1/1953 | Moulton | 136/113 |
| 2,832,814 | 4/1958 | Shannon | 136/90 |
| 2,852,592 | 9/1958 | Salouze | 136/113 |
| 3,200,014 | 8/1965 | Roberts | 136/90 |
| 3,202,548 | 8/1965 | Adlhart et al. | 136/90 |
| 3,275,477 | 9/1966 | Schmid-Wildy | 136/114 |
| 3,376,166 | 4/1968 | Hruden | 136/114 |
| 3,480,480 | 11/1969 | Merz et al. | 136/113 |
| 3,485,678 | 12/1969 | Blaich et al. | 136/170 |

Primary Examiner—Winston A. Douglas
Assistant Examiner—C. F. LeFevour
Attorney—Raymond L. Balfour, Robert H. Robinson and Anthony J. Rossi

[57] ABSTRACT

A membrane extends between and is sealed to the mating exterior and interior surfaces of the container and cover of a multicell battery to provide a liquid-tight seal across the top of each cell compartment inside the battery. The space above the membrane in each of the cell compartments may be used as an electrolyte storage compartment in a battery having dry, charged electrodes. With or without the spaces above the membrane being used to store electrolyte in each cell compartment, the membrane may be used to seal and thus maintain the factory dryness of dry, charged electrodes. As another alternative, the membrane can be used with a "wet" battery (one having electrolyte in contact with the electrodes when shipped from the factory) to prevent spilling or leaking of electrolyte during battery shipment or storage.

8 Claims, 6 Drawing Figures

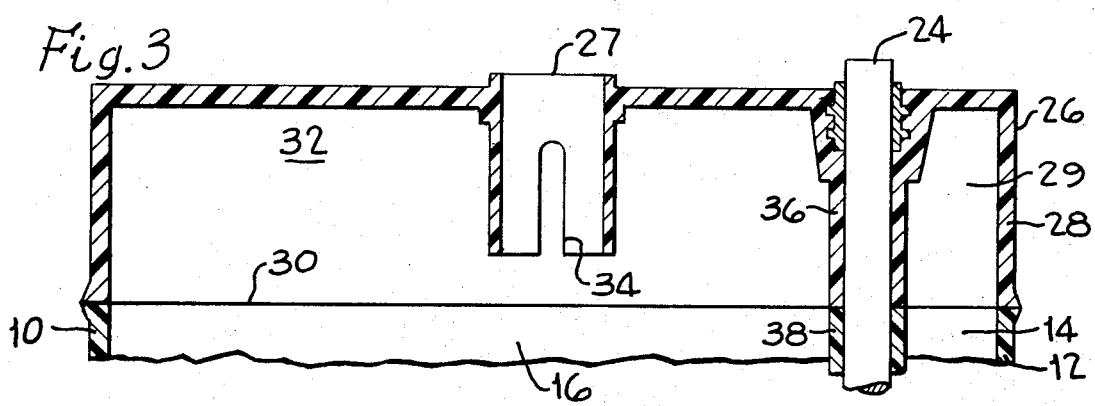
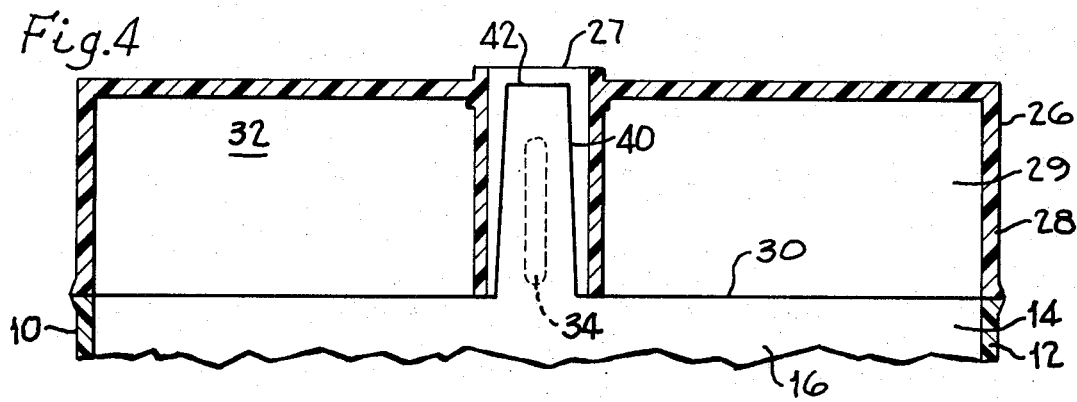
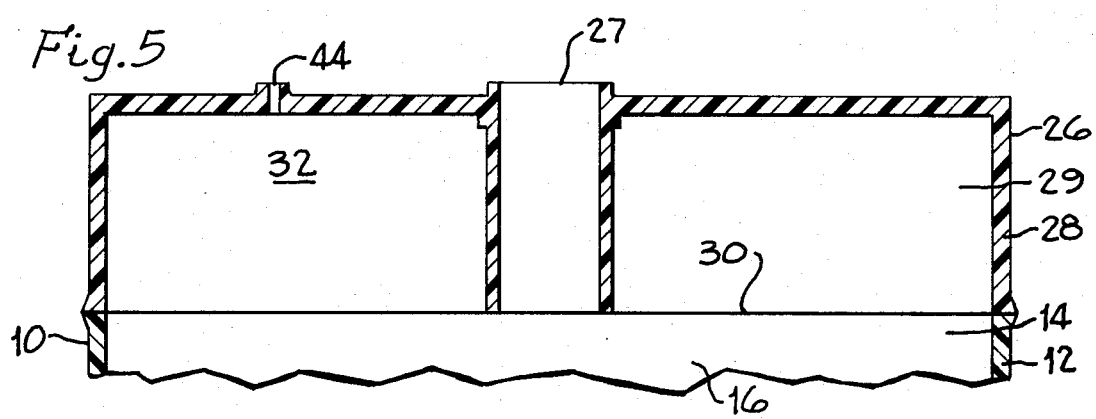
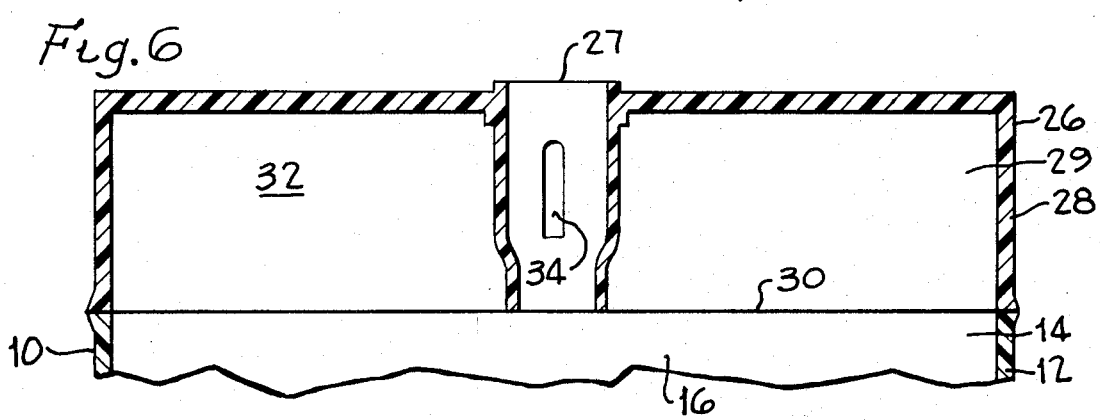

MULTICELL BATTERY HAVING MEMBRANE SEALED BETWEEN COVER AND CONTAINER

CROSS-REFERENCE TO PRIOR APPLICATION

This application is a continuation of Ser. No. 885,856, filed Dec. 17, 1969 now abandoned.

BACKGROUND OF THE INVENTION

There is a need for an automotive battery which can be either activated by the addition of water alone or preferably be activated without the addition of anything from a source external to the battery. To achieve this requires the storage inside the battery of electrolyte or some substance which will produce the electrolyte in the presence of water.

One means for storing electrolyte inside the battery has been to build a reservoir into the cover; see U.S. Pat. No. 2,832,814. Another has been to place an electrolyte capsule inside the container and above the electrodes; see for example U.S. Pat. Nos. 2,733,927, 3,304,202, and 3,455,740, which differ from each other in the means by which the capsules are opened. Each of these prior constructions has had a relatively high cost and the walls of the reservoirs or capsules have occupied a significant portion of the volume inside the battery.

There is also a need for a means to maintain the factory dryness of the charged automotive battery.

There is also a need for a means to prevent the electrolyte of a "wet" battery (one having electrolyte in contact with the electrodes when shipped from the factory) to prevent spilling or leaking of electrolyte during battery shipment or storage.

SUMMARY OF THE INVENTION

With this invention a membrane is placed between and sealed to the exterior and interior walls of both the container and cover to provide a liquid-tight seal across the top of each cell compartment. The space above the membrane in each of the cell compartments may be used as an electrolyte storage compartment in a battery having dry, charged electrodes. With or without the spaces above the membrane being used to store electrolyte in each cell compartment, the membrane may be used to seal and thus maintain the factory dryness of dry, charged electrodes in each cell compartment. As another alternative, the membrane can be used with a "wet" battery to prevent spilling or leaking of electrolyte during battery shipment or storage.

Preferably the cover and the container are made from thermoplastic materials and the membrane is heat sealed to and between the container and the cover.

The membrane may be shaped to have a contour matching that of each cell compartment above the electrodes.

BRIEF DESCRIPTION OF THE DRAWINGS

FIG. 2 shows the membrane between the container and cover, the membrane being sealed to both the container and the cover. The dashed line represents an alternative configuration and position for the membrane. A vent well is shown as part of and projecting downward from the upper surface of the cover.

FIG. 3 is similar to FIG. 2 except that a terminal is shown projecting upward to extend through the cover.

FIG. 4 is similar to FIG. 2 except that the vent well projects downward farther and is sealed to the membrane, and a portion of the membrane resembling a finger projects up into the vent well.

FIG. 5 is similar to FIG. 2 except that the vent well projects downward farther and is sealed to the membrane, there are no slots in the vent well, and there is an opening in the cover which is in addition to the vent well.

FIG. 6 is similar to FIG. 2 except that the vent well projects downward farther, is sealed to the membrane and has a lower section of reduced diameter.

DESCRIPTION OF THE PREFERRED EMBODIMENTS

Figure 1:
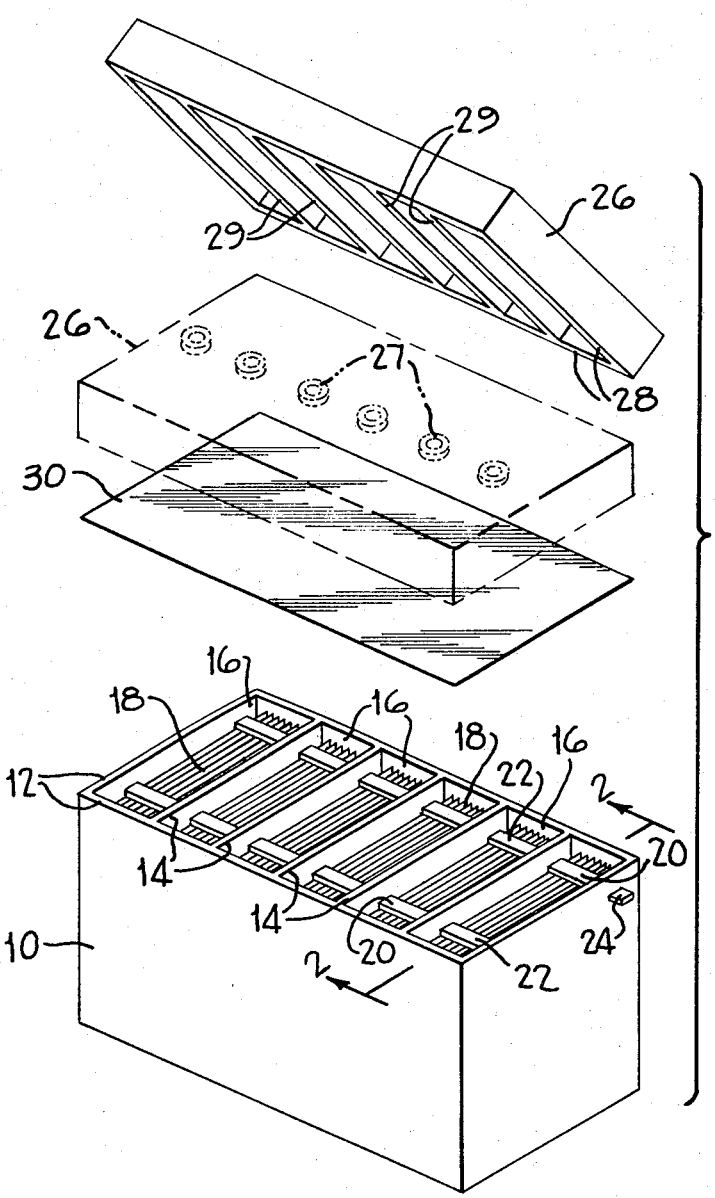
FIG. 1 is an exploded view of a six cell battery showing a container, a cover, and a membrane between the container and cover. Terminals are shown extending to the exterior of the container.

FIG. 1 shows a container 10 having exterior and interior walls 12 and 14, respectively, which divide its interior space into a plurality of cell compartments 16. In each cell compartment are alternately spaced positive and negative electrodes between which are separators, these being collectively identified by the numeral 18. The positive electrodes in one cell compartment are mechanically and electrically connected together by positive strap connectors 20 while the negative electrodes in that same cell compartment are similarly connected together by negative strap connectors 22. The positive strap connector in one cell compartment is electrically connected to the negative strap connector in an adjacent cell compartment by any convenient means. The two strap connectors 20 and 22 may initially be separate pieces which are subsequently electrically connected together at some point in the battery assembly process, or they may be the two ends of a single piece intercell strap connector which extends through the partition 14 either in a slot in the partition or as an insert around which the partition is molded. FIG. 1 shows terminal means 24 extending to the exterior of the container, the terminal means being electrically connected to the positive strap connector 20 for the purpose of conducting electrical current between the exterior of the container and the positive electrodes. Additional terminal means (not appearing in FIG. 1) would extend from the negative strap connector 22 in the cell compartment at the other end of the battery to the exterior of the container. The terminals may be of any desired configuration and may be constructed in any desired manner, including being extensions of the strap connectors in the two end cell compartments around which extensions the exterior walls of the container are molded.

Also shown in FIG. 1 is a cover 26 for the container, the cover having a vent well 27 for each cell compartment. The cover has exterior and interior walls 28 and 29, respectively, on the underside thereof. In the assembled battery the exterior and interior walls of the cover mate with and are sealed to the respective exterior and interior walls of the container to provide liquid tight cell compartments.

Between the container 10 and the cover 26 is a thin membrane 30, shown in FIG. 1. It is the purpose of this invention to seal the membrane to the mating exterior and interior walls of both the cover and container to provide a liquid-tight seal across the top of each cell compartment inside the battery.

In each of the constructions shown in FIGS. 2 through 6 the membrane could be used either to maintain the dryness of the electrodes in a dry, charged battery or to prevent the spilling of leaking of electrolyte from beneath the membrane in a "wet" battery. The remainder of the discussion will focus on another possible function of the membrane, that of a component of an electrolyte storage compartment which permits storage of electrolyte above the membrane in each cell compartment.

FIGS. 2 through 6 illustrate several of many possible battery constructions which may use the membrane to provide an internal electrolyte storage compartment. Each illustration shows the common feature of the membrane between the container and the cover, the membrane being sealed to the exterior and interior walls of both the container and the cover. Among the considerations in battery design illustrated by FIGS. 2 through 6 are the ability to get the electrolyte into the storage compartment after the container, cover, and membrane are sealed together; the ability to keep electrolyte from spilling out of the storage compartment before the membrane is opened; the ability to add water to the cell compartments beneath the storage compartments before the membrane is opened to release the electrolyte; and the ability of gases generated by the battery when in use to be exhausted to the exterior of the battery.

Figure 2:
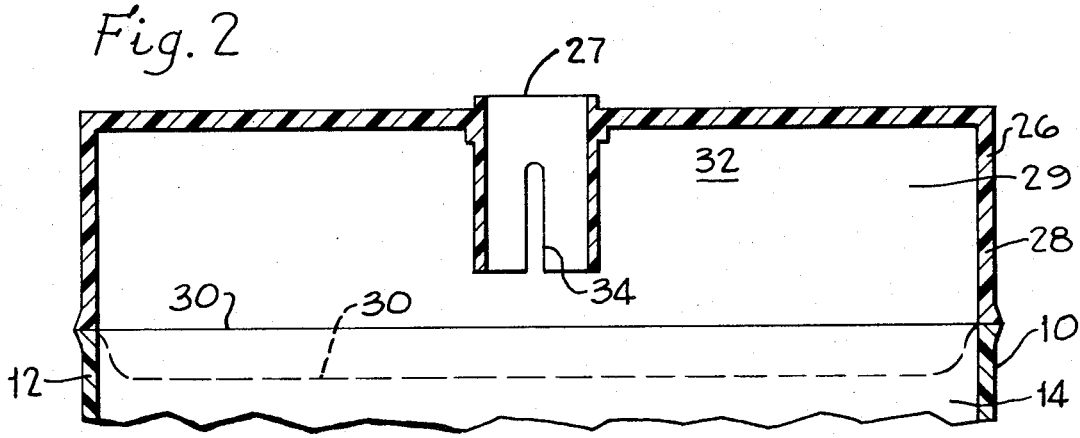
FIG. 2 is a sectional view taken along the line 2—2 of FIG. 1.

FIG. 2 is a cross section showing the cover 26 and membrane 30 after they have been sealed to the container 10. The vent well 27 in the cover has a pair of slots 34 which have been conventionally provided in vent wells for the purpose of permitting gases generated by the battery to escape rather than be trapped below the upper surface of the cover. In addition to serving this conventional function after battery activation, the slots 34 will also permit the escape of air from the electrolyte storage compartment while the electrolyte is being added. To prevent escape of electrolyte from the storage compartment before activation a vent plug may be fitted into the vent well or some small membrane may be sealed across the top of the vent well; neither the vent plug nor the small membrane appears in FIG. 2. Note in FIG. 2 that there is no opportunity for water to be added to the cell compartment 16 before the membrane 30 is opened to release the stored electrolyte; this construction may be used where the concentration of the electrolyte stored in the compartment 32 is such that it will not damage the separators below without first being diluted. Water could be added to the battery after the membrane 30 is opened if desired.

FIG. 3 is similar to FIG. 2 except that a terminal corresponding in function to the one identified by the numeral 24 in FIG. 1 is shown projecting upward to extend through the cover. Like the constructions shown in FIG. 2, the terminal extends to the exteriors of the covered container. Because of the identity of function the terminal shown in FIG. 3 is also identified by the numeral 24. The terminal must project up through the membrane 30 and, to prevent leakage of the electrolyte between the membrane and the terminal, there should be a seal between the two. FIG. 3 shows a construction which easily permits a heat seal. In FIG. 3 a portion 36 of the cover projects downward and surrounds the terminal while a portion 38 of the container projects upward and also surrounds the terminal; the membrane 30 is sealed between the two portions, the mating surfaces of which may be heated prior to sealing.

FIG. 4 is similar to FIG. 2 except that the vent well 27 projects downward farther so that its bottom may be sealed to the membrane 30, and a portion 40 of the membrane having a closure 42 across its top and resembling a finger projects upward into the vent well. With this construction electrolyte could be introduced into the storage compartment 32 through the slots 34 by being poured into the vent around the portion 40 of the membrane. When it is desired to activate the battery the closure 42 of the portion 40 may first be opened and water then poured through the portion 40 into the cell compartment 16; afterward the upstanding walls of the portion 40 may be punctured to allow the electrolyte to flow into the cell compartment.

FIG. 5 also has a vent well 27 projecting downward and being sealed to the membrane 30, similar in this respect to the construction shown in FIG. 4. The cover 10 shown in FIG. 5 also is provided with a second hole 44 which may be provided for the purpose of introducing electrolyte into the storage compartment. The hole 44 may be relatively large if desired, and covered with some kind of seal or plug to prevent the electrolyte from spilling out prior to battery activation. Alternately, the hole 44 may be relatively small as shown in FIG. 5, small enough so that the electrolyte could be introduced by a hypodermic needle, which needle could also remove air from the storage compartment while the electrolyte was being added and thus make slots 34 in the vent well unnecessary or less necessary; after addition of the electrolyte the small hole 44 could be simply left open as a subsequent venting device or could be closed by being heat sealed shut, by being filled with cement by being plugged with some friction-fitting device, etc. If the hole 44 is closed after addition of electrolyte to the storage compartment, it could be punctured and opened at battery activation and subsequently serve as a vent. FIG. 5 shows a construction in which electrolyte may be easily added to the storage compartment 32 but afterward cannot escape if the hole 44 is closed, the vent well 27 is sealed to the membrane 30, and the vent well 27 is without slots. Note that if the vent well 27 is sealed to the membrane 30 the portion of the membrane 30 inside the vent well may first be punctured so that water may be added to the cell compartment 16 after which a hook-like puncturing device may be used to puncture the membrane outside of the vent well and release the stored electrolyte.

FIG. 6 is similar to FIG. 2 except that the vent well projects downward farther and has a lower section of reduced diameter. As in FIG. 5, the vent well 27 is sealed to the membrane. The vent well also has slots 34. With the construction shown in FIG. 6 water could be added to the cell compartment 16 before much of the electrolyte was released by cutting the portion of the membrane inside the vent well with a hollow puncturing device having an external diameter only slightly smaller than the internal diameter of the vent well at its lower section; after the puncturing device was inserted into the vent well but before it is removed it could be used as a filling tube through which water could be poured into the cell compartments. The slots 34, which are provided as an entrance for the electrolyte into the storage compartment 32, will later serve as an exit, and the remainder of the electrolyte may be released from the storage compartment with a hook-like puncturing device as described in the preceding paragraph.

The membrane appearing as a solid line in the drawings is shown as being a flat sheet, although it is not necessary and perhaps not always desirable for the membrane to be flat. The membrane may be shaped in any of infinitely many configurations. Representative of these other configurations and positions is the membrane shown by the dashed line in FIG. 2. The membrane may be shaped to match the contour of the cell compartment above the electrodes and separators, both to provide maximum size in the storage compartment 32 and to receive vertical support from the electrodes and separators. Shaping of the membrane to match the contour of the cell compartment may be done after the membrane is placed across the top of the cell compartment by using thermoforming techniques. The membrane shown in the drawings is shown flat for sake of simplicity, for ease in illustrating the concept, but the invention is not limited to such a simple configuration.

The battery shown in the drawings differs from the one illustrated in U.S. Pat. No. 2,832,814 by providing a much larger electrolyte storage compartment as well as being easier and less expensive to construct. The increased size of storage compartment results from the fact that the thickness of the membrane may be quite small (for instance, from 0.005 to 0.020 inch might be typical). In addition to permitting a greater volume of electrolyte to be stored, the increased size makes it possible to store electrolyte of lower concentration, an advantage because it reduces the threat of damage by concentrated electrolyte to the separators and points to a battery construction in which the concentration of the stored electrolyte is that which is required in the battery after its activation, that is to say the battery might be activated without the addition of either concentrated electrolyte or water from an external source.

The membrane also permits an easy and inexpensive construction of an electrolyte storage compartment, particularly where the container, cover, and membrane are made from thermoplastic materials and are heat sealed together. In the absence of a membrane the mating surfaces of such covers and containers are first heated and then pressed together while still hot to achieve the sealing. The simplicity of using the membrane can be seen from the fact that the membrane may be placed between the container and cover just before they are pressed together, so that the act of sealing the container and cover to the membrane may be done by utilizing a step which would have to be performed even in the absence of the membrane rather than by a new and additional step. The membrane may be placed between the cover and container in the same motion in which the heating element which heated their mating surfaces is removed. An additional advantage of the use of heat as a sealing technique is that the heat dissipates quickly and the desired seal may be achieved quickly, whereas if some other techniques such as cementing is used a greater time delay may be involved before further processing after the sealing step. The membrane is preferably heated before being sealed to the cover and container. While the use of thermoplastic materials such as polypropylene or polyethylene and the use of heat as a sealing technique are preferred, the invention may also be used with other materials and sealing techniques. While the membrane is shown as having the same length and width dimensions as the container, it may if desired be larger during battery assembly with the excess being removed after the cover and container are sealed together.

I claim:
1. A multicell battery comprising the combination of:
   a. A container having exterior and interior walls which divide the space inside the container into a plurality of cell compartments;
   b. a cover having exterior and interior walls on the underside thereof, the exterior and interior walls of the cover mating with and sealed to the respective exterior and interior walls of the container;
   c. positive and negative electrodes within the container; and,
   d. terminal means for conducting electrical current between the exterior of the covered container and the positive electrodes and additional terminal means for conducting electrical current between the exterior of the covered container and the negative electrodes;
   wherein the improvement comprises a membrane between the cover and container, the membrane being sealed to the exterior and interior walls of both the container and cover to provide a liquid-tight seal across the top of each cell compartment.

2. The battery of claim 1 in which the cover and the container are made from thermoplastic materials and the membrane is heat sealed to the container and the cover.

3. The battery of claim 1 in which the membrane is sealed around the terminal means extending upward through the cover.

4. The battery of claim 1 in which the membrane is sealed to a vent well projecting downward from the inner surface of the cover.

5. The battery of claim 1 in which the membrane is sealed around the terminal means extending upward through the cover and in which the membrane is also sealed to a vent well projecting downward from the inner surface of the cover.

6. The battery of claim 2 in which the membrane is heat sealed around the terminal means extending upward through the cover.

7. The battery of claim 2 in which the membrane is heat sealed to a vent well projecting downward from the inner surface of the cover.

8. The battery of claim 2 in which the membrane is heat sealed around the terminal means extending upward through the cover and in which the membrane is heat sealed to vent well projecting downward from the inner surface of the cover.

* * * * *